United States Patent [19]

Glaser et al.

[11] Patent Number: 5,450,538
[45] Date of Patent: Sep. 12, 1995

[54] GRAPHICAL USER INTERFACE CONTROL FOR EXPANSION AND RE-SIZING OF DATA FIELDS IN FORMS

[75] Inventors: Howard J. Glaser, San Jose; Michael J. Darnell, Aptos, both of Calif.

[73] Assignee: International Business Machines Corporation, Armonk, N.Y.

[21] Appl. No.: 219,007

[22] Filed: Mar. 25, 1994

Related U.S. Application Data

[63] Continuation of Ser. No. 789,284, Nov. 8, 1991, abandoned.

[51] Int. Cl.⁶ ............................................. G06F 17/21
[52] U.S. Cl. .................................................. 395/149
[58] Field of Search ............... 395/148, 149, 159, 161; 364/419.1

[56] References Cited

U.S. PATENT DOCUMENTS

| | | | |
|---|---|---|---|
| 4,646,250 | 2/1987 | Childress | 364/518 |
| 4,658,366 | 4/1987 | Posh | 395/149 |
| 4,896,291 | 1/1990 | Gest et al. | 364/900 |
| 4,982,344 | 1/1991 | Jordan | 364/521 |
| 5,140,139 | 8/1992 | Shepard | 395/149 |
| 5,165,015 | 11/1992 | Coggins | 395/155 |
| 5,208,906 | 5/1993 | Morgan | 395/148 |
| 5,231,579 | 7/1993 | Tsuchiya et al. | 364/419 |
| 5,299,305 | 3/1994 | Oomae et al. | 395/149 |

OTHER PUBLICATIONS

Lund et al., "QM Forms", CE Software, Inc. (1989), pp. 1–17.
Pogue, "Forming Opinions", MacWorld (Feb. 1990), pp. 144, 145, 150–155.
Templin, "In Good Form", MacUser (Jan. 1990), pp. 137, 139, 140, 142, 146, and 156–158.
Grant, "The Mac Goes Pro Forma", MacWorld (Jul. 1985), pp. 84–88.
Nimersheim, "A Forms Database Manager for Windows", Home-Office Computing (Feb. 1991), pp. 74–75.
J. D. Foley, A. Van Dam, "Fundamentals of Interactive Computer Graphics," 1982.
AD/Cycle, User Interface Architecture Board, IBM Corporation Programming Systems, "AD/Cycle Level 2 User Interface Supplement", Sep. 1, 1991.
Goodman, D., "The Complete HyperCard Handbook", 1988, Bantam Books, New York, U.S.A., pp. 149–158, 151–152.
Osborn, "McWrite and McPaint", 1984, McGraw-Hill, Berkeley, California, U.S.A., pp. 5–10.
Research Disclosure No. 29503, No 295, Nov. 1988, Havant GB, p. 840, "Method of Editing Panes of a Displayed Window".
IBM Technical Disclosure Bulletin, vol. 32, No. 8B, Jan. 1990, New York, U.S.A., pp. 231–232, "Pre-Selection Highlighting".
Communication Cover Sheets Regarding European Search Report (5 pages).

*Primary Examiner*—Mark K. Zimmerman
*Assistant Examiner*—N. Kenneth Burraston
*Attorney, Agent, or Firm*—Baker, Maxham, Jester & Meador

[57] ABSTRACT

A computer interface system employing a menu-graphical graphical user interface for the entry of text data in a data store receives user inputs for controlling the graphical user interface, which interface provides a document form display including at least one data entry field for text entry. The system is invested with the ability to generate a pointer in the display which is positionable in response to a control input from a user. The system is responsive to a selected positioning of the pointer and to a further control input from the user for varying the size of the data field.

19 Claims, 4 Drawing Sheets

GRAPHICAL USER INTERFACE CONTROL FOR EXPANSION AND RE-SIZING OF DATA FIELDS IN FORMS

This application is a file wrapper continuation of application No. 07/789,284, filed Nov. 8, 1991, now abandoned.

BACKGROUND OF THE INVENTION

The field of the present invention is computer command interfacing and the provision of user control functionality in a data processing system. More particularly, the invention relates to that category of input/output system known as the user interface, species of which include graphical display and menu-driven command capability.

The use of graphical user interface technology to operate data processing equipment is known in the art. Commercially available graphical user interface systems include "WINDOWS", by Microsoft Corporation, and "PRESENTATION MANAGER", by International Business Machines Corporation. By the expression "graphical user interface" is meant a data input/output interface providing a graphical display, including text and associated graphics information, as opposed to a text-only display. Such systems are ideally suited and conventionally adapted for menu-driven operation. That is, they allow a user to control computer operations by selecting commands from one or more menus exhibited on a display without entering statements in alphanumeric form via a keyboard. Selections are made using a mouse or other control device that moves a pointer to an icon image in the display. An icon is a visual symbol in a graphics display which signifies information, function, or a menu entry. An icon is "selected" by moving a mouse-controlled pointer or cursor to it and pressing a button on the mouse. In the art, this is referred to as "point-and-click".

In the prior art graphical user interfaces, data entry into an application is supported by document display representations with data entry fields. In this regard, where data entry into a data store is desired, data entry fields are used to enter such information and provide various views of that store. However, in existing graphical user interfaces, the fields have a size which is fixed and can be changed only by modification of the underlying code. Inherently, the fixed size of a data entry field limits the amount of data which can be placed in the field and entered in the data store.

Investigation has revealed a need for a graphical user interface control system that would allow a user, by its activation, to create and modify highly structured form documents with one or more expandable data entry fields. Where data entry into a data store is desired, structured text forms with expandable data entry fields could be used to enter a variable amount of information into the data store. Such text forms would appear as a document and would also represent a collection of data entry fields with labels in the main work area of the window (user area). Expansion of an existing entry field would be required where the application permits the user to add text descriptions associated with specific facts in the data store. A preferred system would provide a data entry form possessing the characteristics of both dialogue boxes and text files in that users would have entry fields to specify requested data, but would be able to tailor the form by dynamically expanding one or more data entry fields where permitted by the application. Preferably, this control capability would be provided in a visually apparent manner, indicating to the user that data fields can be expanded and suggesting the manner in which that expansion can be implemented.

SUMMARY OF THE INVENTION

The present invention is directed to a computer system employing a menu-driven graphical user interface for the entry of text data in a data store. The system, in a preferred aspect, is adapted to receive user inputs for controlling the graphical user interface, which interface provides a document form display including at least one data field for text entry. The system is further adapted to generate a mouse-controlled pointer in the display which is positionable in response to a first control input from a user. The system is responsive to a second control input from a user for conducting a resizing operation to vary the size of the data field.

Thus, it is an object of the present invention to provide a dynamically expandable data field in an otherwise structured form document. Advantageously, the system permits the customization of data input and output by enabling the user to exercise complete control over the size of the data field.

BRIEF DESCRIPTION OF THE DRAWINGS

The foregoing and other features, objects and advantages of the invention will be apparent from the following detailed description of exemplary embodiments thereof, when read in conjunction with the accompanying drawing, in which:

FIG. 2 illustrates a menu-driven graphical user interface display generated in accordance with the present invention including a structured form document with data entry fields and associated data descriptors, wherein one of the data entry fields is expandable in response to a user control input;

FIG. 4 illustrates the graphical user interface display of FIG. 2 with a resizing rectangle image generated during a resizing of a selected data entry field.

DESCRIPTION OF THE PREFERRED EMBODIMENTS

Figure 1:
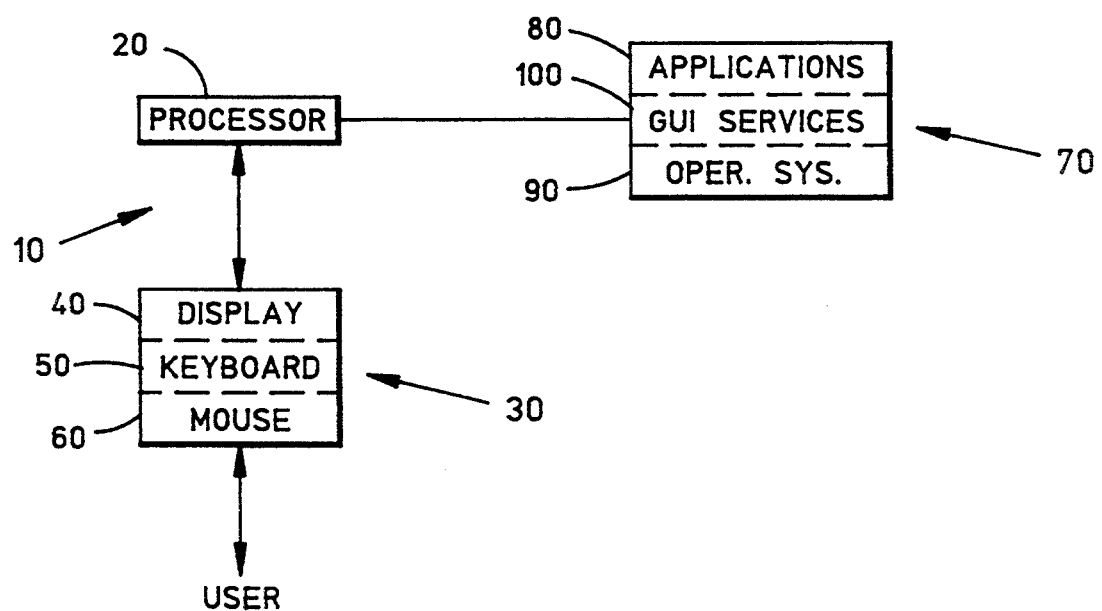
FIG. 1 is a block diagrammatic illustration of a data processing system including components for the provision of a graphic user interface in accordance with the present invention.

It will be understood and appreciated by those skilled in the art that the inventive concepts set forth herein, pertaining to the provision of an adaptive control interface in a digital processing system, may be embodied in a variety of system contexts. One such system is illustrated by way of example in FIG. 1, wherein a data processing system designated generally as 10 includes a data processing unit 20 of conventional design. An input/output system 30 is arranged in communication with the processing unit 20 and includes a video display terminal 40 with a resolution of at least 1024×760 Pixels, a conventional keyboard 50, and a mouse or other cursor control device 60 with at least one input button or switch. The data processing system 10 further includes a data storage resource 70, which may include a conventional disk drive device or other storage system. The data storage resource 70 is provided with plural data storage areas incorporating an applications program module 80, an operating system 90 and a GUI (graphical user interface) data control structure 100.

The data processing unit 20 may be selected from any of a number of conventional processor devices, including, but not limited to, processors commonly found in that class of data processing apparatus known as "personal" computers or PCs. The data processing unit 20 operates in conjunction with the operating system 90 to control system hardware operations and program execution. The operating system 90 is of conventional design and may include such well-known products as the DOS or OS/2 operating systems. These operating systems are products of Microsoft Corporation and International Business Machines Corporation.

It is contemplated that any number of commercially available applications programs may be placed in the applications program module 80, including database control programs and other software. Particular advantage may be derived when the system 10 is programmed to operate as a workstation data input device, wherein customer or other data is input using a form display. In that case, the system 10 may be used in lieu of printed forms and manual data entry.

Control of the input/output system 30 is provided by the GUI data control structure 100, which directs operations of the data processing unit 20 in response to user-initiated control signalling from the input/output system 30. In accordance with the present invention, the GUI data control structure 100 provides graphical user interface control information to the processor 20 for directing the operation of the video display terminal 40, the keyboard 50 and the mouse 60 to enable a system user to input command instructions and data to the data processing system 10.

Figures 2, 4:
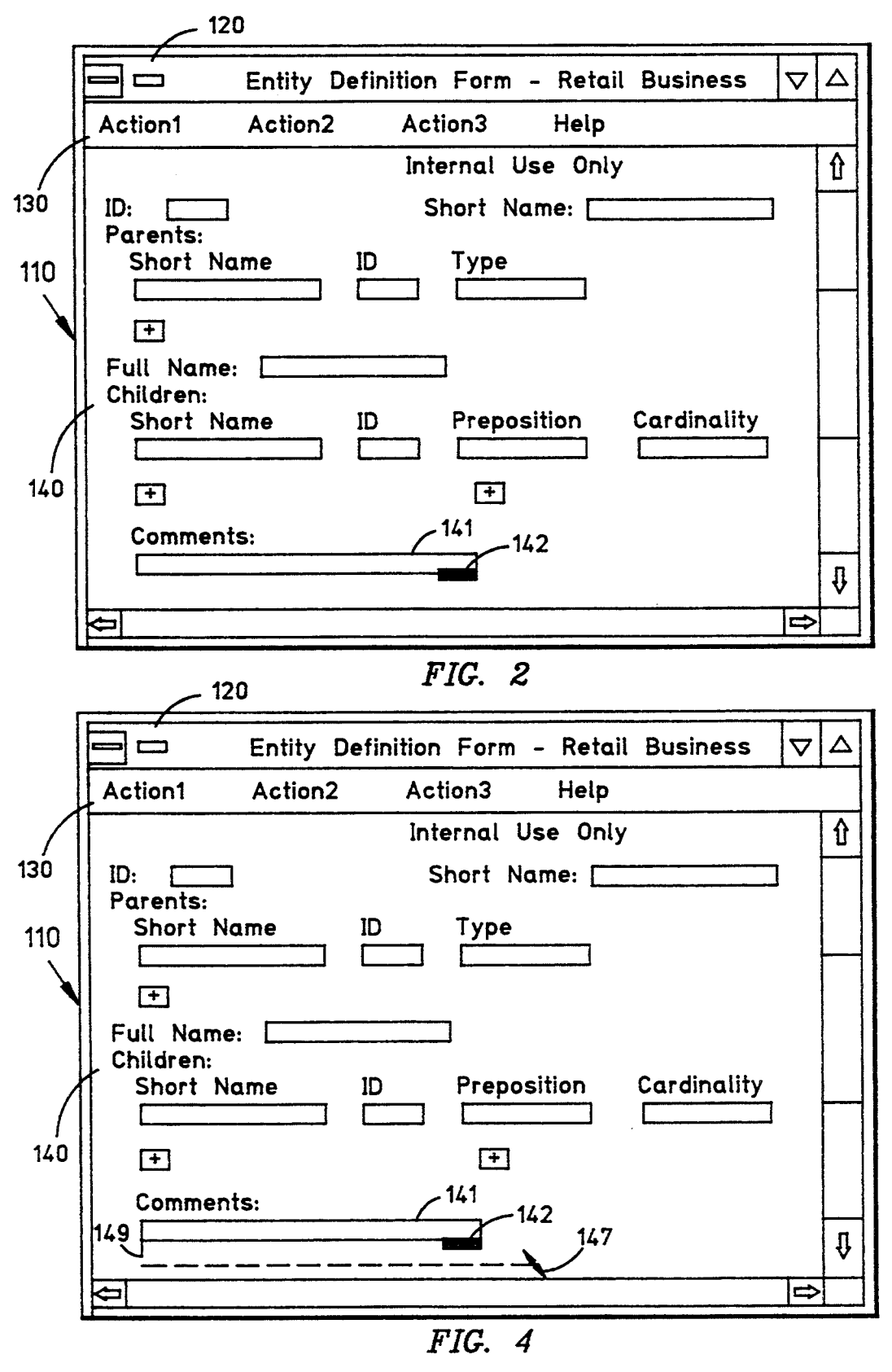

Referring now to FIG. 2, a document form display or window 110 generated by the GUI data control structure 100 is shown. The document display 110 is generated in the video display terminal 40 via control information provided by the GUI data control structure 100. The display 110 includes a title block 120 at the top of the display containing information about the application then being executed from the applications program module 30. Below the title block 120 is a command menu bar 130 including plural command menu items for inputing selected control information to the system. As is conventional, the menu bar includes one or more "Action" categories. To access a category, the user performs a conventional "point-and-click" operation using the mouse 60. That is, the user controls the mouse to position a mouse pointer over the desired category, and thereafter operates a button on the mouse to register the selection. When an "Action" category is choosen, a "pull-down" menu appears containing one or more commands relating to the category. These may be selectively activated using the point-and-click procedure.

The display of FIG. 2 further includes a data entry block 140. The entry block 140 has disposed therein a series of data entry fields with associated data descriptors providing various information about an individual. Each data entry field is represented by a rectangle and, preferably, is shaded differently than the display background. In addition, a data entry field 141 is provided in conjunction with the descriptor entitled "Comments." This entry field may be used to add additional data concerning a subject as required by the application. It includes an icon in the form of a small darkened rectangle 142 at the lower right hand corner. This will be referred to as a "grab point", and its function is described below. The display of FIG. 2 further includes a plurality of pushbuttons 144 disposed in the data entry block 140. The pushbuttons are represented by small rectangles with plus (+) signs therein. The functions of the pushbuttons are not relevant to the present invention and will not be considered further herein.

Figure 3:
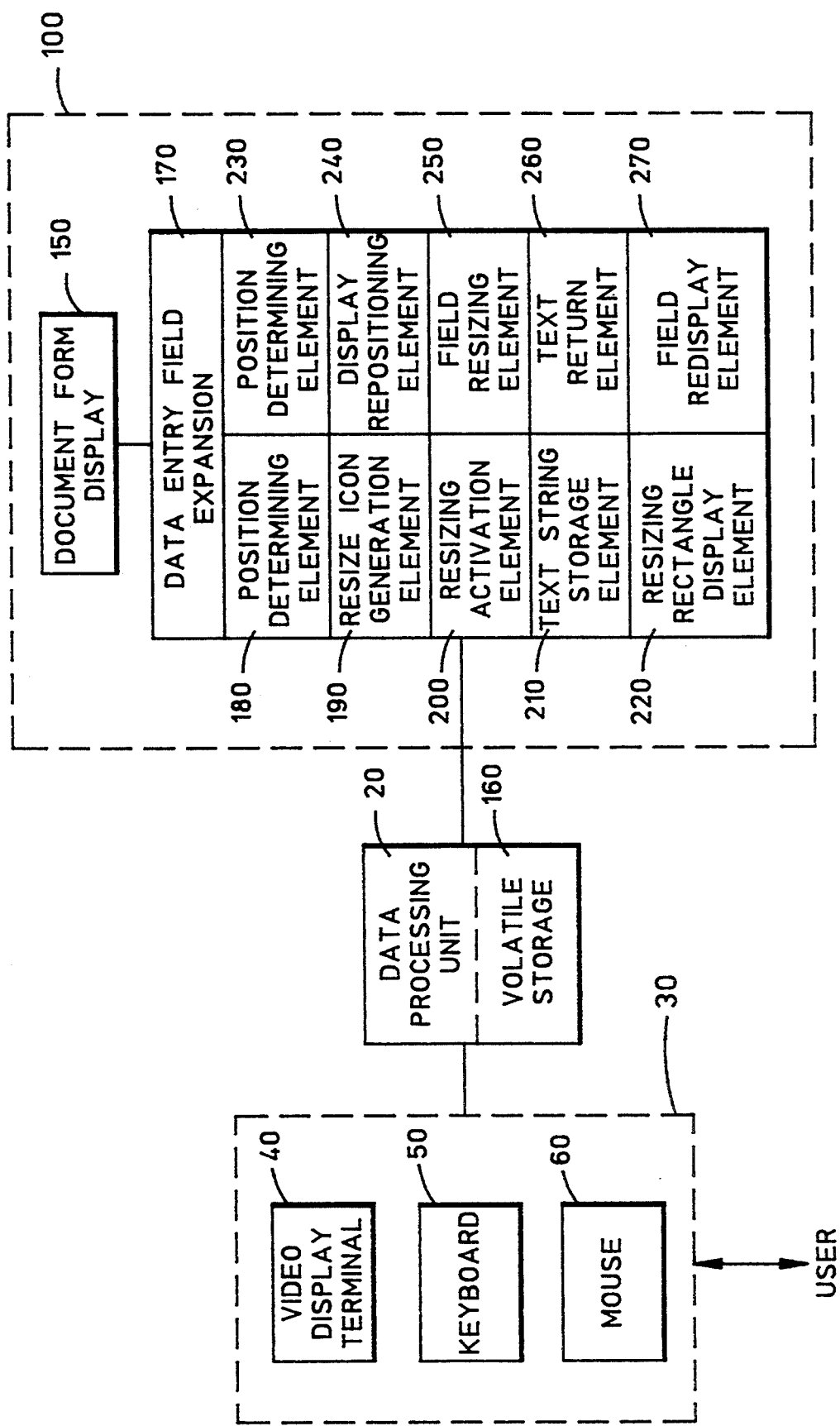
FIG. 3 is a detailed block diagram illustrating additional aspects of the system shown in FIG. 1.

Referring now to FIG. 3, the GUI data control structure 100 includes a document form display module 150. The display module 150 provides control information to the data processing unit 20 for generating a series of data objects representing components of the display of FIG. 2. This information is represented in pseudocode form in Appendix A hereto. The display code of Appendix A, which is preferably implemented using an object oriented programming language such as Smalltalk or C++, defines ordered collections or arrays which are used to store the position, size (dimension), type, and contents of data entry fields, push buttons and labels. When the form window of FIG. 2 is generated, this data may be placed in a volatile storage device 160 associated with the processor 120, and used to refresh the display 110.

As shown in Appendix A, ordered collections are created for each of the labels, data entry fields and pushbuttons, as well as the Comments entry field 141. The labels are positioned by the column and row location of the lower left hand corner of the text string. The label text string contents are also specified. The entry fields and pushbuttons are positioned by the column and row location of the lower left hand corner and upper right hand corner of the rectangular box representing the entity. In addition, in the case of entry fields, single quotation marks ' ' are used to define a place holder for text entry, and letters A-D are used in all but the comments field to define field attributes. The pushbutton arrays are defined to include a plus '+' sign image. As further shown in Appendix A, the comments array further defines a grabpoint rectangle image at the lower right hand corner of the comments data field.

The grabpoint rectangle image is essentially a stationary icon represented, for example, by a bit map whose location is given by the syntax of the Smalltalk command labeled "Comment add" in Appendix A. Thus, when the processor system obtains the control information for displaying the Comments data field 141, the information includes the grabpoint icon, causing the display of the small rectangle 142 in the lower right hand corner of the field. It is asserted that a graphics package underlying the display illustrated in FIGS. 2 and 4 has information respecting the display location of every display feature, including the Comments field and the grabpoint icon.

The GUI data control structure 100 further includes a data field expansion module 170. The expansion module 170 includes plural process control elements. These control elements provide control information to the processor 20 to permit the re-sizing of a selected data entry field in the document display of FIG. 4. The control elements of the module 170 control the system 10 in accordance with the procedure shown in pseudocode form in Appendix B. The process by which a data entry field is caused to expand is further shown in the flow diagram of FIG. 5.

Figure 5:
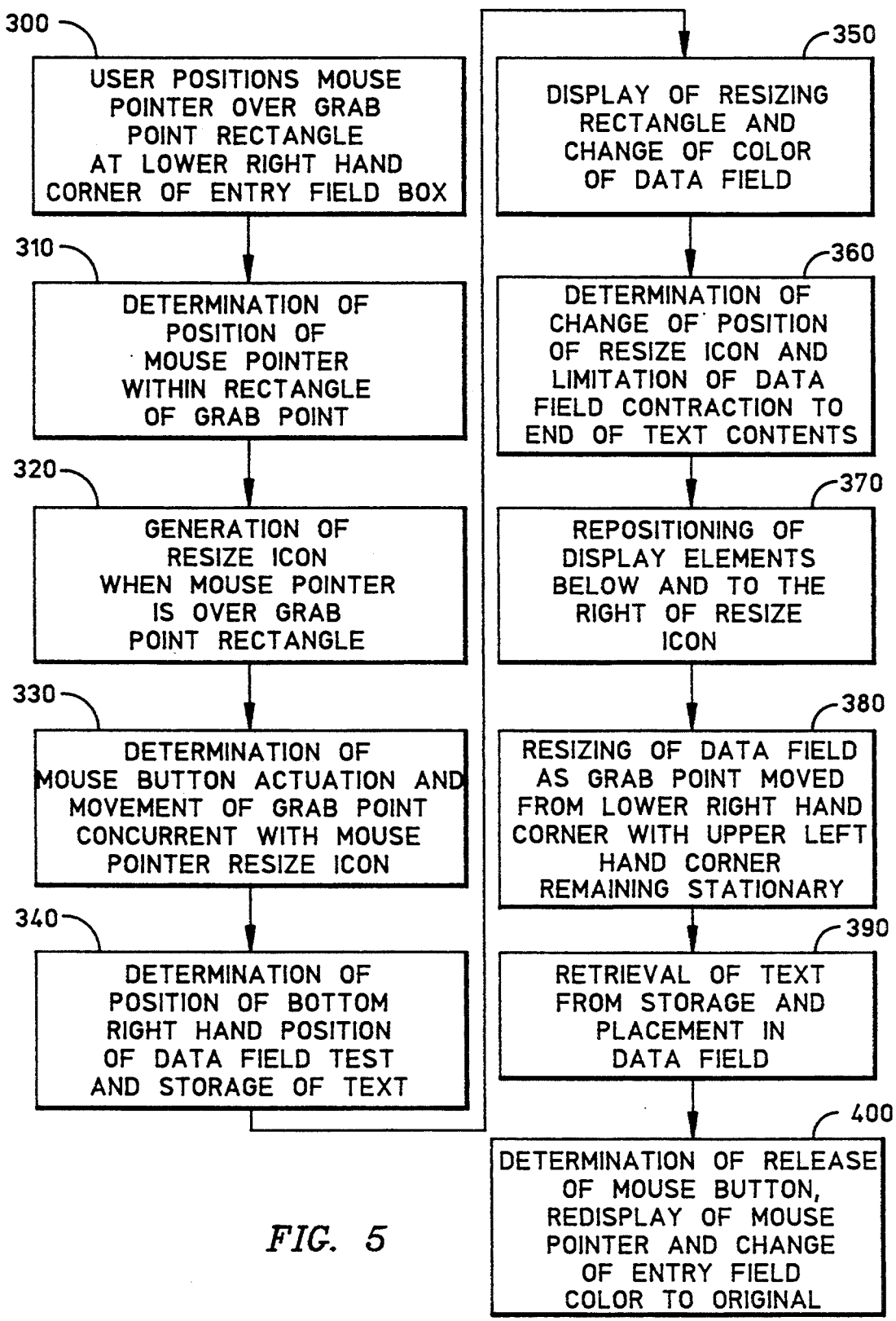
FIG. 5 is a flow diagram illustrating a process of resizing a selected data entry field in the graphical user interface display of FIG. 2.

Thus, with reference now to FIGS. 3, 4, and 5, together with the pseudocode listing of Appendix B, the data entry field 141 bearing the data descriptor "Comments," is dynamically expandable in order to provide for the input of extended text data into a data store. To expand the data entry field 141, the user operates the mouse 60 to position a mouse pointer over the grabpoint rectangle 142 provided at the lower right hand corner of the data entry field. This action is illustrated at step 300 of the flow diagram of FIG. 5. In the data entry field expansion module 170, a position determining element 180 controls the processor 20 to continuously sample an input from the mouse 60 to determine whether the mouse pointer is within the rectangle position of the grab point icon. The control information provided by the position determining element 180 is shown in pseudocode form at line 10 of Appendix B, and is represented by process step 310 in FIG. 5. When the mouse pointer is over the grabpoint icon, a resize icon generation element 190 controls the processor 20 to change the mouse pointer to a re-size icon 147. The re-size icon 147 is shown in FIG. 3 as a double-headed arrow image; advantageously, it provides a visual indication of the two x-y directions in which data field expansion/contraction is allowed to occur. The control information provided by the icon generation element 190 is shown in pseudocode form at line 500 of Appendix B, and is represented by process step 320 in FIG. 5.

Using the re-size icon 147 and grabpoint icon 142 to re-size the Comment field may be implemented by available means. For example, the AD/Cycle user interface available from the assignee of this application affords the ability to re-size a symbol in a display representation of a network by the use of "size handles". See IBM Document Number ADUIB-2.0, Sep. 1, 1991.

With the re-size icon 147 displayed, the re-sizing operation of the invention is commenced by pressing a designated button on the mouse 60. This activates a re-sizing control input effectively equivalent to a re-sizing command. For as long as the mouse button is pressed, a resizing activation element 200 controls the processor 20 to conduct a resizing procedure. This procedure permits the user to expand or contract the size of a data field by movement of the re-size icon 147. The control information provided to the processor 20 by the resizing activation element 200 is shown in pseudocode form at line 510 of Appendix B, and is represented by process step 330 in FIG. 5. As the resizing procedure executes, a text string storage element 210 controls the processor 20 to check for characters in the entry field, locate the bottom and right hand end positions of the text, and place the text in a temporary storage area, such as the storage area 160. The control information provided by the text string storage element 210 is shown in pseudocode form at line 1000 of Appendix B, and is represented by process step 340 in FIG. 5.

Following the storage of text information from the data field, a resizing rectangle display element 220 controls the processor 20 to display the data entry field in a modified color and to generate a resizing rectangle display 149. The resizing rectangle 149 is shown in FIG. 4 as a dashed line entity whose upper left hand corner corresponds to that of the data entry field, but whose lower right hand corner corresponds to the position of the resize icon 147. The position of the resize icon 147 thus determines the size of the resizing rectangle 149. The size of the resizing rectangle 149 indicates to the user the change in size of the data entry field which is being expanded or contracted. The control information provided by the resizing rectangle display element 220 is shown in pseudocode form at lines 1010-1030 of Appendix B, and is represented by process step 350 in FIG. 5.

As the resize icon 147 is moved, a position determining element 230 controls the processor 20 to determine the incremental change in position relative to the position of the mouse pointer prior to resizing. Moreover, the element 230 controls the processor to limit any horizontal or vertical contraction of the entry field to the determined end of the data field text contents. The control information provided by the position determining element 230 is shown in pseudocode form at lines 1040-1045 of Appendix B, and is represented by process step 360 in FIG. 5. Based on the determined position of the resize icon 147, a display repositioning element 240 provides control information to the processor 20 to reposition any labels, data entry fields and pushbuttons located below the Comments field. The control information provided by the repositioning element 240 is shown in pseudocode form at lines 1050-1070 of Appendix B, and is represented by process step 370 in FIG. 5.

As the resize icon 147 is moved, a field resizing element 250 controls the processor 20 to expand or contract the Comments field from the bottom right hand corner, with the upper left hand corner maintaining its original position. The control information provided by the repositioning element 250 is shown in pseudocode form at line 1080 of Appendix B, as is represented by process step 380 in FIG. 5.

When the mouse button is released, the re-sizing control input is deactivated and the data field resizing procedure is terminated. A text return element 260 controls the processor 20 to fetch the text data previously stored and return it to the data entry field. The control information provided by the text return element 260 is shown in pseudocode form at line 1090 of Appendix B, and is represented by process step 390 in FIG. 5. In a final resizing step, a field redisplay element 270 controls the processor 20 to change the resize icon back to a mouse pointer icon, to return the entry field to its original color and to redisplay the field in its changed size. The control information provided by the redisplay element 270 is shown in pseudocode form at lines 1095-2000 of Appendix B, and is represented by process step 400 in FIG. 5.

In accordance with the apparatus and method above, the user is provided with a form which maintains its initial structure, but which is dynamically expandable to provide a resized entry field. Advantageously, the system allows direct manipulation by a mouse using a resizing rectangle that serves both as a visual indicator that a data entry field can be resized and as a control to resize the entry field.

While several preferred embodiments of a graphical user interface control system providing a resizable entry field have been shown and described, it will be understood that modifications and adaptations thereof will occur to persons skilled in the art. For example, the control system provided by the GUI data control structure could be located within the applications module 80, although it is preferred that this system be located to provide input/ouput and graphical user interface services for all applications.

Moreover, it should be apparent that the graphical user interface control herein provided may be readily adapted to permit data field resizing in a data output mode as well as a data input mode. For example, the display of FIG. 4 may be used to present data from a data store. Data in the Comments field would be displayed to the extent permitted by the nominal size of the field. Additional data would be displayed by expanding the field. Thus, in view of the various modifications and adaptations likely to occur to those skilled in the art, it will be appreciated that the protection afforded the invention should not be limited except in accordance with the spirit of the following claims and their equivalents.

APPENDIX A

| | |
|---|---|
| Label:= OrderedCollection new. | /Create an ordered /collection for labels |
| EnField:= OrderedCollection new. | /Create an ordered collection for entry fields |
| Button:= OrderedCollection new. | /Create an ordered collection for buttons |
| Comment= OrderedCollection new. | /Create an ordered collection for comment /field |
| Label add: | (OrderedCollection with: 'Internal Use Only' with: (200@380)). |
| Label add: | (OrderedCollection with: 'ID :' with:(60@300)). |
| Label add: | (OrderedCollection with: 'Short Name:' with: (220@300)). |
| Label add: | (OrderedCollection with: 'Parents:' with: (60@270)). |
| Label add: | (OrderedCollection with: 'Short Name' with: (100@245)). |
| Label add: | (OrderedCollection with: 'ID' with: (270@245)). |
| Label add: | (Ordered Collection with: 'Type' with: (360@245)). |
| Label add: | (OrderedCollection with: 'Full Name:' with: (60@140)). |
| Label add: | (OrderedCollection with: 'Children:' with: (60@100)). |
| Label add: | (OrderedCollection with: 'Short Name' with: (90@80)). |
| Label add: | (OrderedCollection with: 'ID' with: (270@80)). |
| Label add: | (OrderedCollection with: 'Preposition' with: (340@80)). |
| Label add: | (OrderedCollection with: 'Cardinality' with: (460@80)). |
| Label add: | (OrderedCollection with: 'Comments:' with: (60@80)). |
| EnField add: | (OrderedCollection with: 90@296 with: (124@320)with:' 'with:'A'). |
| EnField add: | (OrderedCollection with: 320@296 with: (470@320)with:"with:'A'). |
| EnField add: | (OrderedCollection with: 80@216 with: (230@240)with:' 'with:'B'). |
| EnField add: | (OrderedCollection with: 260@216 with: (290@240)with:' 'with:'B'). |
| EnField add: | (OrderedCollectino with: 340@216 with: (420@240)with:' 'with:'B'). |
| EnField add: | (OrderedCollection with: 140@131 with: (290@155)with:' 'with:'A'). |
| EnField add: | (OrderedCollection with: 80@46 with: (230@70)with:' 'with:'C'). |
| EnField add: | (OrderedCollection with: 260@46 with: (290@70)with: ' 'with:'C'). |
| EnField add: | (OrderedCollection with: 340@46 with: (440@70)with:' 'with:'D'). |
| EnField add: | (OrderedCollection with: 460@46 with: (540@70)with:' 'with:'D'). |
| Button add: | (OrderedCollection with: 89@180 with: (100@200)with: '+'). |
| Button add: | (OrderedCollection with: 80@10 with: (100@30)with: '+'). |
| Button add: | (OrderedCollection with: 340@20 with: (360@40)with: '+'). |
| Comment add: | (OrderedCollection with: 80@20 with: (300@60)with: ' ' with: grabpoint image). |

APPENDIX B

| | | |
|---|---|---|
| 10 | IF mouselocation = grabpoint THEN GOSUB 500 | |
| 500 | IF mousepointer not resizeicon then SET mousepointer = resizeicon | /Display re-size /icon at grap piont |
| 510 | IF button1 = Down then GOSUB 1000 ELSE 10 | /if button 1 down /re-size entry field |
| 1000 | PUT textstring AT: textbuffer | /Store entry field /text |
| 1010 | WHILE button1 = Down | /Display re-sizing /rectangle |
| 1020 | DISPLAY Rectangle with origin:(NWcorner) corner:(mouseLocation) | |
| 1030 | WEND | |
| 1040 | INC = oldcorner - mouselocation | /Compute position /change |
| 1050 | LABEL DO:[:ITEM\| ((ITEM at:2)Y) < (mouseLocation) IF TRUE:[ITEM at:2 PUT ((ITEM AT:2)-(0@INC))]] | /Move labels, /fields, and buttons /below re-sized |
| 1060 | EntryField DO:[:ITEM\| ((ITEM < (mouselocation) IF TRUE:[ITEM at:2 PUT ((ITEM AT:2) -(0@INC))]] | /entry field |
| 1070 | Button DO:[:ITEM\| ((ITEM at:2)Y) < (mouselocation) IF TRUE:[ITEM at:2 PUT ((ITEM AT:2) -(0@INC))]] | |
| 1080 | Resize EntryFieldWin with origin:(NWCORNER) corner: (mouseLocation) | /Re-size entry field |
| 1090 | PUT textstring at:EntryFieldWin | /Put text string /back in entry field |
| 2000 | DISPLAY EntryFieldWin | /Re-display entry /field |

I claim:

1. In a data processing system, the data processing system having a data processing unit, a video display terminal, a keyboard, a cursor control device for providing control inputs to said system and a data storage resource, a combination comprising:

a database control system operating on said data processing system to generate an interactive database for the storage of text data;

a graphical user interface system providing a document blank form display representation (document representation) on said video display terminal including at least one data field for text entry into said database and display for creating a filled-in form;

means for generating a pointer in said document representation;

grabpoint means for associating a predetermined location on said document representation with a blank data field in said document representation, said data field being adapted for on-line text entry into said database;

means for positioning said pointer at said predetermined location in said document representation in response to a positioning control input from said cursor control device; and re-sizing means responsive to said pointer positioned at said predetermined location and to a re-sizing control input from said cursor control device for dynamically changing the size of said data field during text entry to accommodate additional text entry into said database.

2. The combination of claim 1, said grabpoint means including means for generating a grabpoint image at said data field, and wherein said resizing means for changing the size of said data field is responsive to a positioning of said pointer over said grab point image.

3. The combination of claim 1, further including means responsive to the position of said pointer for generating a resize icon image in said document representation in response to said pointer positioned at said predetermined location and to said re-sizing control input.

4. The combination of claim 1, further including means responsive to changing the size of said data field for storing a text string located in said data field during said changing.

5. The combination of claim 1, further including means responsive to said pointer positioned at said predetermined location and to said re-sizing control input for displaying a resizing rectangle display element in said document representation, adjacent said data field, said re-sizing rectangle representing a changed size of said data field.

6. The combination of claim 1, further including means responsive to the position of said pointer for providing in said documentation representation an indication of an incremental change in size of said data field during said changing.

7. The combination of claim 1, wherein said document representation includes plural display elements and wherein said combination further includes means responsive to a position of said pointer for repositioning said display elements in said document representation to respective locations which prevent overlap with said data field during said changing.

8. The combination of claim 1, wherein said data field is also for displaying text data to be input in said database.

9. The combination of claim 1 wherein said data field displays text data to be output from said database.

10. A menu-driven graphical user interface control system for the online entry of text data in an interactive data store, comprising:
   database control means for generating said interactive data store for the storage of text data;
   input means for receiving user-selected control inputs;
   display means for producing the display of a document form with at least one data entry field for online text entry into said data store;
   means for inputting said text entry into said data store;
   pointer means for producing the display of a pointer in said display;
   positioning means for positioning said pointer in said display in response to pointer positioning control input; and
   re-sizing means responsive to a re-sizing control input representing a data entry field resizing command for dynamically resizing said data entry fields during text entry into said data store.

11. The control system of claim 10, further including grabpoint means for producing a grabpoint image in said display, and wherein said re-sizing means is further responsive to a positioning of said pointer over said grabpoint image for re-sizing said data entry field.

12. The control system of claim 11, further including:
   re-size icon means responsive to positioning said pointer over said grabpoint image and to activation of said re-sizing control input for changing said pointer to a re-sizing icon;
   re-sizing representation means responsive to positioning said pointer over said grabpoint image and to activation of said re-sizing control input for producing display of a re-sizing display element at said data entry field which represents a changed size of said data entry field;
   means for changing the size of said re-sizing display element in response to movement of said re-sizing icon; and
   means for responsive to deactivation of said re-sizing control input for changing size of said data entry field to substantially the size represented by said re-sizing display element.

13. The control system of claim 10, wherein said re-sizing means is further responsive to positioning of said pointer over a portion of said display for re-sizing said data entry field.

14. The control system of claim 10, further including means for producing a resize icon image in response to said pointer being positioned over a selected portion of said data entry field.

15. The control system of claim 10, further including means for storing a text string located in said data entry field in response to said resizing operation.

16. The control system of claim 10, further including means for producing the display of a resizing rectangle display element in response to said resizing, said re-sizing rectangle display element representing a changed size of said data entry field.

17. The control system of claim 10, wherein said display includes plural display elements and wherein said system further includes means responsive to changing the size of said data entry field for repositioning of said display elements to prevent overlap with said data entry field.

18. The control system of claim 10 further including means responsive to the position of said pointer and to activation of said re-sizing control input for determining the size to which said data field is changed.

19. In a system providing a graphical user interface for the online entry of text data in a data store, the graphical user interface including a graphical document display having at least one data entry field for said online data store text entry, the system including means for displaying the graphical document display and means for activating user-selected control inputs for said graphical user interface, a method for dynamically changing the size of said data store data entry field during online text entry into said data store, the method comprising the steps of:
   generating a pointer in said document display;
   positioning said pointer in said document display at one of said data entry fields in response to a positioning control input, said data entry field being adapted for online text entry into said data store; and
   dynamically varying the size of said data entry field during text entry to accommodate additional text entry into said data store in response to a repositioning of said pointer over a selected portion of said document display and a re-sizing control input.

* * * * *